United States Patent
Ouchi et al.

(10) Patent No.: US 7,242,370 B2
(45) Date of Patent: Jul. 10, 2007

(54) DISPLAY APPARATUS, METHOD OF CONTROLLING THE SAME, AND MULTIDISPLAY SYSTEM

(75) Inventors: Akihiro Ouchi, Ohta-ku (JP); Shigehiro Kadota, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 401 days.

(21) Appl. No.: 10/658,958

(22) Filed: Sep. 9, 2003

(65) Prior Publication Data

US 2004/0046772 A1    Mar. 11, 2004

(30) Foreign Application Priority Data

Sep. 11, 2002   (JP)   .............................. 2002-265778

(51) Int. Cl.
*G09G 5/00*   (2006.01)
(52) U.S. Cl. ...................................... 345/1.3
(58) Field of Classification Search ................. 345/1.1, 345/3.3, 3.4, 1.3, 1.2, 2.2, 3, 699
See application file for complete search history.

(56) References Cited

U.S. PATENT DOCUMENTS

| | | | |
|---|---|---|---|
| 5,767,818 A * | 6/1998 | Nishida ........................ | 345/1.1 |
| 6,583,771 B1 * | 6/2003 | Furuhashi et al. ............. | 345/1.1 |
| 6,593,902 B1 * | 7/2003 | Ogino et al. .................. | 345/55 |
| 6,870,518 B1 * | 3/2005 | Brenner ....................... | 345/1.3 |
| 6,943,753 B2 * | 9/2005 | Shirasaki et al. ............. | 345/3.1 |
| 2002/0140625 A1 * | 10/2002 | Kidney et al. ............... | 345/1.1 |
| 2002/0167460 A1 * | 11/2002 | Baudisch et al. ............ | 345/3.3 |
| 2004/0008155 A1 * | 1/2004 | Cok ............................ | 345/1.3 |

FOREIGN PATENT DOCUMENTS

JP    2000-148080 A    5/2000

* cited by examiner

*Primary Examiner*—Amr A. Awad
*Assistant Examiner*—Stephen G Sherman
(74) *Attorney, Agent, or Firm*—Canon U.S.A., Inc., IP Division

(57) ABSTRACT

In a multidisplay system, an image is displayed without necessitating a display control signal supplied from an external device. Each image display device in the multidisplay system includes an interface for receiving image data and transferring the image data to an image display device at a downstream location. Each image display device also includes a DDC (Display Data Channel) communication processor and a rewritable memory for storing EDID (Extended Display Identification Data) information. When another image display device is connected at a downstream location, EDID information is acquired from the connected image display device via the DDC communication processor, and display resolution information and interconnection information are set. In particular, the display resolution described in the EDID information is rewritten by the display resolution information set in the above process.

14 Claims, 13 Drawing Sheets

DISPLAY APPARATUS, METHOD OF CONTROLLING THE SAME, AND MULTIDISPLAY SYSTEM

BACKGROUND OF THE INVENTION

1. Field of the Invention

The present invention relates to an image display device and a method of controlling the same, and more particularly, to an image display device suitable for use in a multidisplay system in which an image is displayed using a plurality of image display devices connected to each other and a method of controlling such an image display device.

2. Description of the Related Art

Image display devices for use in conjunction with computers or the like and display devices of the dot-matrix type such as liquid crystal displays or plasma displays are widely used. In those display devices, the number of pixels is fixed. Therefore, the resolution (the number of pixels) of an input image signal must be converted to an optimum resolution, depending on the number of pixels of a display device being used.

FIG. 12 is a functional block diagram of a common image display device having the capability of resolution conversion. In FIG. 12, reference numeral 100 denotes an image output unit which outputs an image signal, and 200 denotes an image display device. The image display device 200 includes an image input interface 201, a resolution converter 202, a display device driver 203, a controller 204, and a display device 205.

In this system, an image signal output from the image output unit 100 is input to the image input interface 201 of the image display device 200. If the image signal input from the image output unit 100 is an analog signal, the image input interface 201 converts the input image signal into digital form. On the other hand, in a case in which the image signal input from the image output device 100 is a digital transmission signal according to a digital signal transmission standard such as TMDS, the image input interface 201 outputs the digital signal to the resolution converter 202 via a receiver.

In a case in which the resolution of the display device 205 is, for example, XGA (1024×768 pixels) and the input image signal has a resolution of, for example, SVGA (800×600 pixels) lower than the resolution of the display device 205, the resolution converter 202 scales up the number of pixels in the horizontal and vertical directions of the input image signal by a factor of 1.28 thereby generating an image display signal having the same number of pixels as that of the display device 205.

Conversely, if the resolution of the input image signal is, for example, UXGA (1600×1200) greater than that of the display device 205, the resolution converter 202 scales down the number of pixels in the horizontal and vertical directions of the input image signal by a factor of 0.64 thereby generating an image display signal having the same number of pixels as that of the display device 205.

The controller 204 controls the scaling-up/down process described above. The display device driver 203 displays an image on the display device 205 in accordance with the image display signal generated by the resolution converter 202.

As is well known, an operating system (OS) installed on a personal computer has the capability of automatically determining an optimum format in which an image signal is output from the computer to a display connected to the personal computer. This capability is known as the plug and display capability. To achieve the plug and display capability, an image display device has a memory (such as a memory 206 shown in FIG. 12) in which attribute information associated with displaying is stored, and a computer determines, on the basis of the attribute information, an optimum format in which an image signal is supplied from the computer to the image display device, wherein the computer acquires the attribute information by performing DDC (Display Data Channel) communication with the image display device. (DDC is an extended interface standard which allows transmission of information from a display to a host computer thereby making it possible to use a video signal in an extended manner). This attribute information is called EDID information. EDID stands for Extended Display Identification Data and is a specification for transmission of information associated with a display from the display to a host computer. A format in which data is transmitted for the above purpose is defined in EDID. For example, EDID information includes information indicating the resolution of an image display device and the frequencies of horizontal and vertical scanning signals. Thus, if an image display device is formed so as to have the plug and display capability and if the resolution and other necessary information associated with the image display device is described in the EDID information, a computer (image output unit) can determine an optimum format in which an image signal is supplied from the computer to the image display device.

A multidisplay system is known in the art. In this system, a plurality of image display devices are arranged, for example, in the form of an M×N array, and a single image is displayed using those image display devices. The multidisplay system has advantages that a large screen can be easily achieved, a depth is smaller than that of a single display having a corresponding large screen size, and high brightness can be achieved. Because of the advantages described above, the multidisplay system is used in various applications, such as displays for use in exhibitions or on advertising towers, in which a large-sized display is needed. The technique of displaying an image using a multidisplay system allows for a single high-resolution display device by combining a plurality of low-resolution display devices.

An example of a multidisplay system is disclosed in Japanese Patent Laid-Open NO. 2000-148080. The multidisplay system disclosed in Japanese Patent Laid-Open NO. 2000-148080 is described below with reference to FIG. 13.

In FIG. 13, reference numeral 1001 denotes a multidisplay interface circuit serving as a display control apparatus, and reference numeral 1002 denotes a display device. In this figure, suffixes -1, -2, . . . , -n following reference numeral 1001 are used to denote similar multidisplay interface circuits, and suffixes -1, -2, . . . , -n following reference numeral 1002 are used to denote similar display devices. The multidisplay interface circuit 1001 includes an input data processor 1004, a data output unit, a control data processor 1031 and a control unit.

The data output unit includes a frame memory write circuit 1007, a frame memory read circuit 1008, a data selector 1009, frame memories 1010 and 1011, and an up-scaler 1012. The control unit includes a horizontal write start position register 1017, a horizontal write length register 1018, a vertical write start position register 1019, a vertical write length register 1020, scale-up factor registers 1021 and 1022, a horizontal read position register 1023, a vertical read position register 1024, a horizontal synchronization register 1025, a vertical synchronization register 1026, an output timing signal generator 1014, a microcomputer 1028, an ID setting circuit 1029 and a data storage memory 1030.

Image data transferred from the image output unit is written into the frame memory 1010 or 1011 in the data output unit via the input data processor 1004. In this process of writing the image data, memory areas into which the image data is written is controlled by the horizontal and vertical write start position registers 1017 and 1019 and the horizontal and vertical write length registers 1018 and 1020 in the controller. The image data is read from the frame memory 1010 or 1011 and transferred to the display device 1002 after being scaled up.

The microcomputer 1028 in the control unit extracts commands contained in control data received via a control bus, and the microcomputer 1028 transfers data stored in the data storage memory 1030 into respective registers 1017 to 1026 of the control unit. Those commands specify which parts of the image data should be displayed by the respective display devices 1002-n (n=1, 2, . . . ). In some cases, the command in the control data includes an ID number indicating which one of display interface circuits 1001 in the multidisplay system should execute the command. In this case, the microcomputer 1028 compares the ID number included in the command with an ID number in the ID setting circuit 1029, and the microcomputer 1028 executes the command if they are identical to each other.

In the present multidisplay system, as described above, while the same image data is input to all display interface circuits of the multidisplay system, the respective display interface circuits capture display data of different display areas specified by the control data and display the captured data.

At present, some personal computers have the capability of outputting a signal with as high a resolution as QXGA (2048×1536 pixels). Display devices used in conjunction with such high-performance personal computers are needed to have the capability of displaying images with corresponding high resolution.

In conventional display devices of the dot-matrix type, even if image signals applied to display devices have high resolution, images displayed on the display devices are not as high in resolution as the input image signals, because the resolution of display devices is not high enough. One technique for displaying an image having as high resolution as that of an original signal is to increase the number of pixels of a display device. However, it is expensive to develop such a high-performance display device and a high performance controller for controlling the display device.

One possible technique of solving the above problem is, as disclosed in Japanese Patent Laid-Open NO. 2000-148080, to display an image using a multidisplay system including a plurality of display devices. However, in conventional multidisplay systems, it is necessary to input a display control signal together with an image signal to respective display devices in order that a correct part of an image is displayed on each display device.

SUMMARY OF THE INVENTION

In view of the above, it is an object of the present invention to provide an image display device and a method of controlling the same, which make it possible to easily form a multidisplay system.

It is another object of the present invention to provide a technique of automatically informing a host device of an optimum resolution depending on the layout of image display devices in a multidisplay system.

It is another object of the present invention to provide a multidisplay system and a method of displaying an image, capable of displaying an image without a display control signal supplied from an external device.

To achieve the above objects, the present invention provides an image display device having a display unit, comprising input/output means for receiving image data from an image display device disposed at an upstream location and transferring it to an image display device disposed at a downstream location, acquisition means for, if the image display device disposed at the downstream location is connected to the present image display device, acquiring resolution information from the image display device disposed at the downstream location, generation means for generating resolution information on the basis of the resolution information acquired by the acquisition means and the resolution of the display unit, and first storage means for storing the generated resolution information such that the image display device disposed at the upstream location can acquire the resolution information.

The present invention also provides method of displaying an image by controlling an image display device having a display unit, comprising the steps of inputting image data from an image display device disposed at an upstream location and outputting the received image data to an image display device disposed at a downstream location, acquiring, if the image display device disposed at the downstream location is connected to the present image display device, resolution information from the image display device disposed at the downstream location, generating resolution information on the basis of the resolution information acquired in the acquisition step and the resolution of the display unit, and storing the generated resolution information such that the image display device disposed at the upstream location can acquire the resolution information.

The present invention also provides a display control apparatus for controlling an image display device having a display unit, comprising input/output means for transferring image data received from an image display device disposed at an upstream location and transferring it to an image display device disposed at a downstream location, acquisition means for acquiring resolution information associated with the image display device disposed at the downstream location, generation means for generating resolution information on the basis of the resolution information acquired by the acquisition means and the resolution of the display unit, and first storage means for storing the generated resolution information such that the image display device disposed at the upstream location can acquire the resolution information.

Further objects, features and advantages of the present invention will become apparent from the following description of the preferred embodiments with reference to the attached drawings.

DESCRIPTION OF THE PREFERRED EMBODIMENTS

The present invention is described in further detail below with reference to preferred embodiments in conjunction with the accompanying drawings.

First Embodiment

Figure 1:
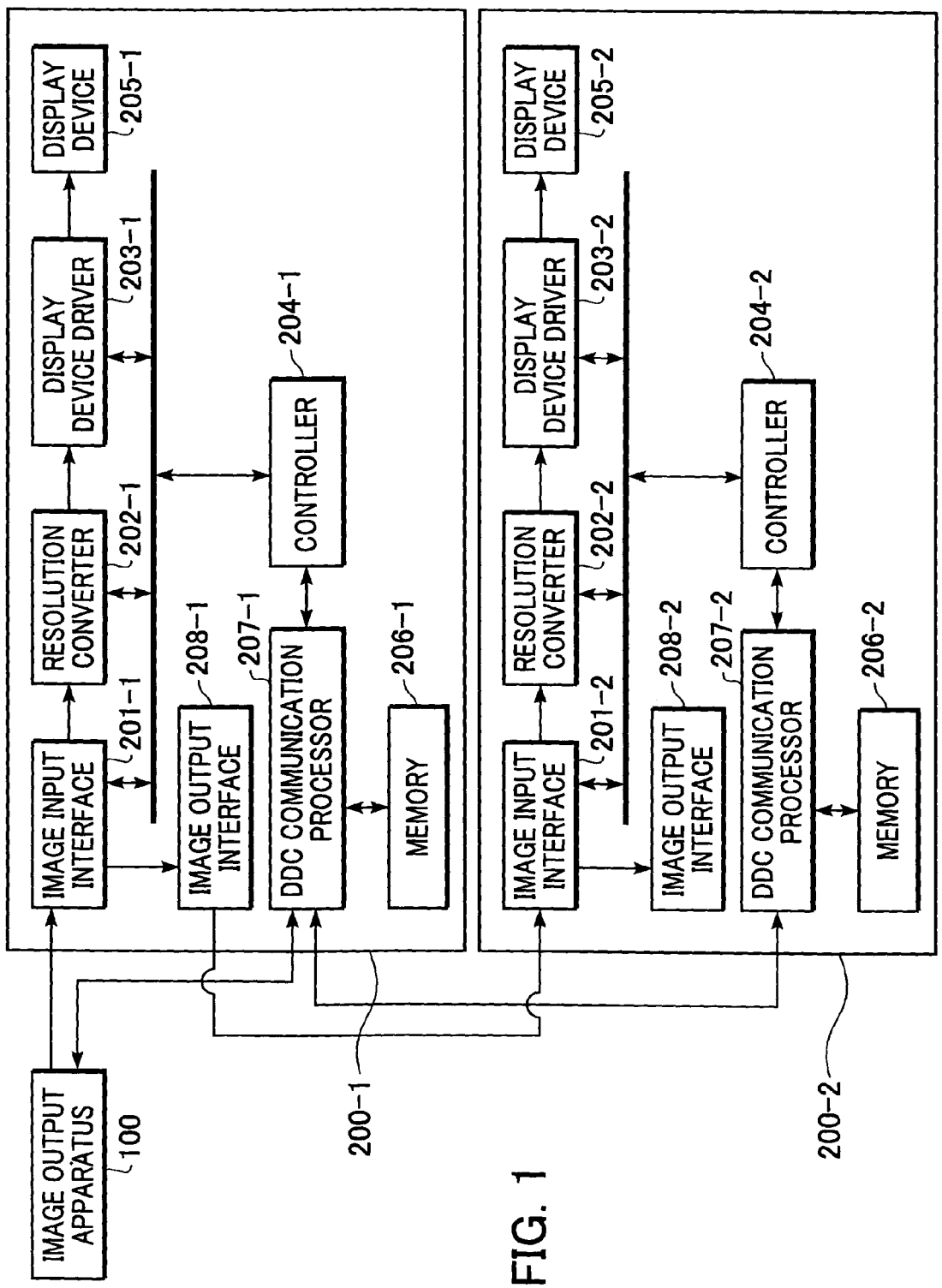
FIG. 1 is a block diagram showing an example of a construction of an image display device according to a first embodiment of the present invention.

FIG. 1 is a block diagram showing a construction of an image display device according to a first embodiment of the present invention.

In FIG. 1, reference numeral 200 denotes an image display device including a display device 205, an image input interface 201 for inputting image data from an image output unit 100 (hereinafter, referred to as a personal computer), a resolution converter 202 for converting the resolution of the input image data into a resolution optimum for the display device; a display device driver 203 for generating image display signal supplied to the display device, a controller 204 for generally controlling the image display device, a rewritable memory 206 for storing EDID information, a DDC communication processor 207 for performing DDC communication with an external device, and an image output interface 208 for outputting image data to the outside. Note that in the present embodiment, two similar image display devices, denoted by reference numeral 200 with suffixes 1 and 2, are used.

In the system shown in FIG. 1, image data output from a personal computer 100 is input to an image display device 200 via an image input interface 201. The input image data may be in the form of an analog signal or a digital signal. In the case in which the input image data is an analog signal, the image input interface 201 includes an analog-to-digital converter for converting the input image signal into digital data at optimum sampling timings and outputting the resultant digital data to the resolution converter 202. In the case in which the input image data is a digital transmission signal according to a digital signal transmission standard such as TMDS, the image input interface 201 receives the image data using a receiver according to the standard and transfers the received digital signal to the resolution converter 202.

The controller 204 detects the resolution of the input image data from horizontal and vertical synchronization signals included in the image data (provided to the image input interface 201).

The resolution converter 202 scales up or down the input image data so that the resolution of the resultant image data matches the number of pixels of the display device 205. For example, when the number of pixels of the display device 205 is equal to that defined in the SVGA standard (800×600) and the resolution (detected by the controller 204) of the input image data is that defined in the VGA standard (640×480), the resolution converter 202 scales up the number of pixels in the horizontal and vertical directions of the input image signal by a factor of 1.25 thereby generating an image display signal having the same number of pixels as that of the display device 205. Conversely, if the resolution of the input image signal is, for example, UXGA (1600× 1200) greater than that of the display device 205, the resolution converter 202 scales down the number of pixels in the horizontal and vertical directions of the input image signal by a factor of 0.5 thereby generating an image display signal having the same number of pixels as that of the display device 205.

The controller 204 controls the scaling-up/down process performed by the resolution converter 202, detects the resolution of the input image data, and performs a DDC communication process which will be described later. The display device driver 203 displays an image on the display device 205 in accordance with the image display signal generated by the resolution converter 202.

The image output interface 208 serves to transfer input image data to an image display device at a next stage. The image output interface 208 is formed differently depending on whether the input image data is in the form of an analog signal or a digital signal. In the case in which the input image data is an analog signal, the image output interface 208 buffers the input image data prior to output. If the input image data is a digital signal, the image output interface 208 transfers the digital transmission signal using a transceiver according to a digital transmission standard such as the TMDS standard. Herein, the input signal is directly output.

Figure 2:
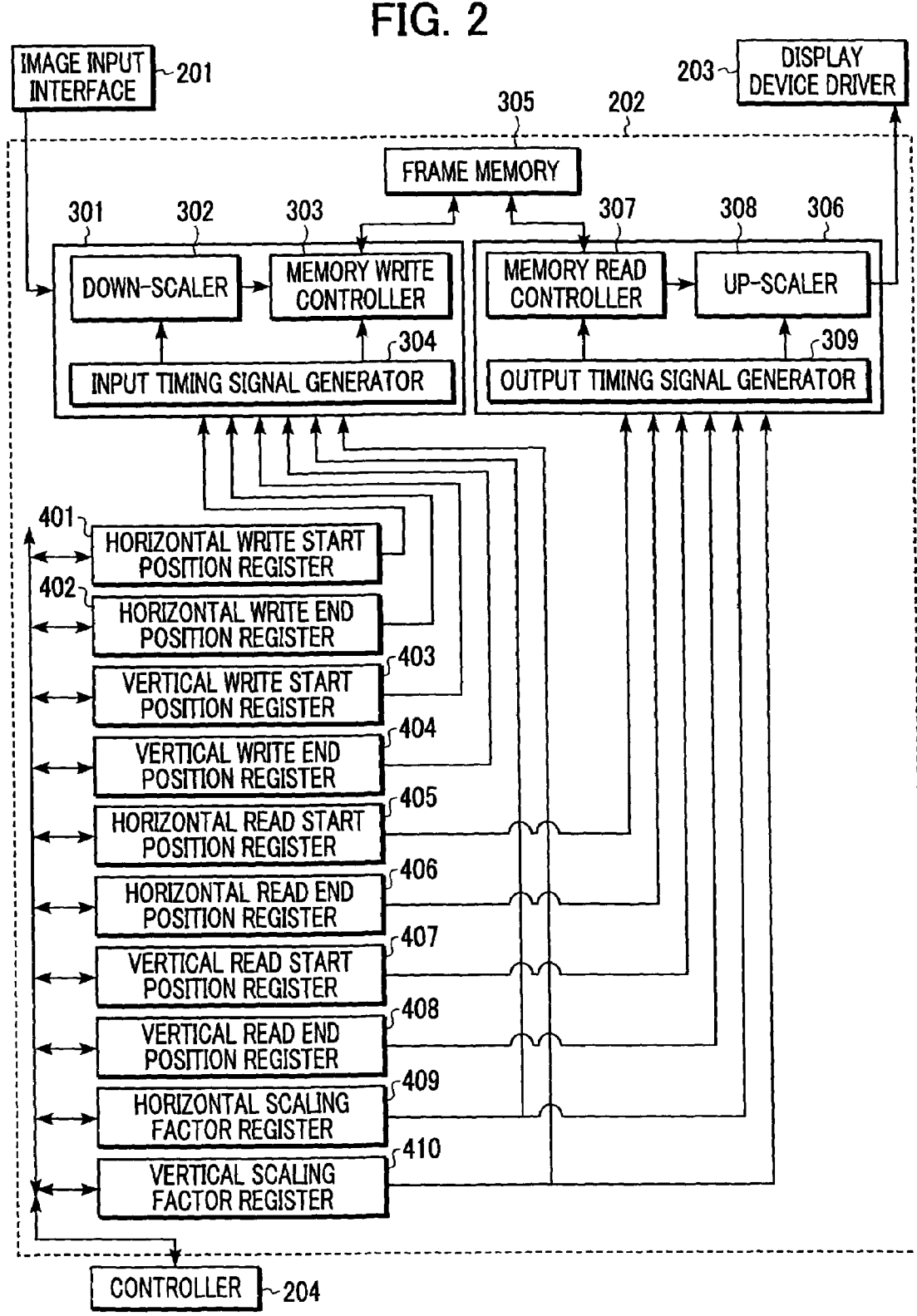
FIG. 2 is a block diagram showing an example of the detailed structure of a resolution converter according to the first embodiment of the present invention.

FIG. 2 is a block diagram showing an example of a detailed structure of the resolution converter 202. In FIG. 2, reference numeral 301 denotes an image data down-scaling block including a down-scaler 302, a memory write controller 303, and an input timing signal generator 304. Reference numeral 305 denotes a frame memory for storing image data. Reference numeral 306 denotes an image data up-scaling block including a memory read controller 307, an up-scaler 308, and an output timing signal generator 309.

The resolution converter 202 also includes a horizontal write start position register 401, a horizontal write end position register 402, a vertical write start position register 403, and a vertical write end position register 404. Which part of the input data should be written into the frame memory 305 is specified by the data stored in those registers. Instead of specifying the horizontal and vertical write end positions by the registers 402 and 404, horizontal and vertical write lengths may be specified by data stored in similar registers.

The resolution converter 202 also includes a horizontal read start position register 405, a horizontal read end position register 406, a vertical read start position register 407, and a vertical read end position register 408. Which part of the input data should be read from the frame memory 305 is specified by the data stored in those registers. Instead of specifying the horizontal and vertical read end positions by the registers 406 and 408, horizontal and vertical read lengths may be specified by data stored in similar registers.

Reference numeral 409 denotes a horizontal scale-up/down factor register and 410 denotes a vertical scale-up/down factor register. Data stored in those registers specify the scale-up/down factors by which image data is scaled up/down by the image data down-scaling block 301 and the image data up-scaling block 306. If the scale-up/down factors are set to be equal to 1, the image data is not scaled up/down. Setting of those registers is performed under the control of the controller 204.

Referring again to FIG. 1, reference numeral 207 denotes a DDC communication processor for performing DDC communication with a personal computer 100 or another image display device 200 connected to the present image display device 200. Reference numeral 206 denotes a rewritable memory for storing attribute information in the form of EDID information according to the VESA (Video Electronics Standard Association) standard.

Communication between the personal computer 100 and the memory 206 using the DDC communication processor 207 allows the personal computer 100 to acquire EDID information stored in the memory 206 and to output image data in an optimum format to the image display device 200. That is, the so-called plug-and-display capability is achieved. Furthermore, in the image display device according to the present embodiment, the capability of communication between the controller 204 and the memory 206 makes it possible to rewrite the EDID information stored in the memory. Furthermore, the capability of communication between the controller 204 and another image display device connected to an input port or an output port of the present image display device 200 makes it possible to supply attribute information between the present image display device and another image display device. In the present embodiment, information associated with the resolution and information associated with the number of connected image display devices are transmitted via DDC communication. The DDC communication processor 207 is described in further detail below.

Figure 3:
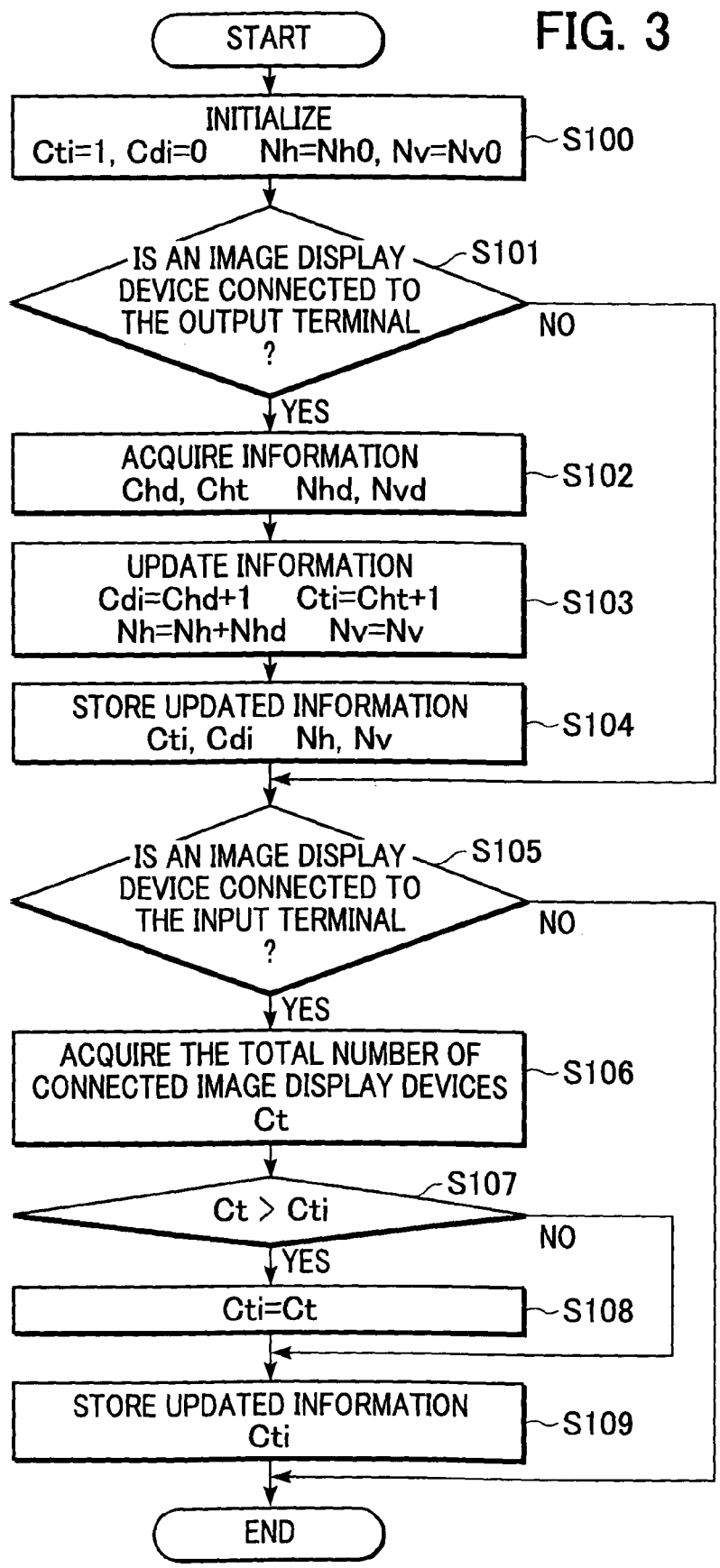
FIG. 3 is a flow chart showing a process of setting attribute information of the image display device according to the first embodiment of the present invention.

In the present system, as shown in FIG. 1, two similar image display devices (200-1 and 200-2) according to the present embodiment are connected to each other. In the following description with reference to FIG. 3, the operation of only the image display device 200-1 at the first stage is explained unless a description of the operation of the other image display device 200-2 is necessary.

First, in step S100, attribute information is initialized such that the total number of image display devices Cti=1, the number of image display devices at downstream locations Cdi=0, the number of pixels in the horizontal direction Nh=Nh0, and the number of pixels in the vertical direction Nv=Nv0. Nh0 and Nv0 denote the numbers of pixels each image display device 200 has. In this specific embodiment, it is assumed that Nh0=800 and Nv0=600. In the next step S101, it is determined whether the image display device 200-2 is connected to the output port of the image display device 200-1. This can be accomplished by pulling up the output DDC communication terminal to a high level via a pull-up resistor. More specifically, the DDC communication processor 207-1 establishes a communication channel between the controller 204-1 and the image display device 200-2 connected to the output port of the image display device 200-1. Thereafter, the controller 204-1 tries communicating with the outside. If an acknowledge signal is received as a response, it is determined that the image display device 200-2 is connected to the output port. Herein, if it is determined that no image display device 200-2 is connected, the process skips to step S105.

If it is determined that the image display device 200-2 is connected, the process proceeds to step S102. In step S102, attribute information of the image display device 200-2, that is, the number of image display devices at downstream locations Chd, the total number of image display devices Cht, the number of pixels in the horizontal direction Nhd, and the number of pixels in the vertical direction Nvd are acquired. In this process, the DDC communication processor 207-1 establishes a communication channel with the image display device 200-2 connected to the output port and acquires the values of the above parameters from the information stored in the memory 206-2 of the image display device 200-2.

The process then proceeds to step S103. In step S103, the attribute information of the image display device 200-1 is updated. More specifically the number of image display devices at downstream locations Cdi is set to Chd+1, the total number of image display devices Cti is set to Cht+1, the number of pixels in the horizontal direction Nh is set to Nh+Nhd, and the number of pixels in the vertical direction Nv is set to Nv.

In the next step S104, in response to a request issued by the controller 204-1, the DDC communication processor 207-1 establishes a communication channel between the controller 204-1 and the memory 206-1, and the controller 204-1 stores updated information, that is, Cti=2, Cdi=1, Nh=1600 (=Nh+Nhd=800+800), and Nv=600, into the memory 206-1.

In the next step S105, it is determined whether an image display device is connected to the input port. In this process, in response to a request issued by the controller 204-1, the DDC communication processor 207-1 establishes a communication channel with a device connected to the input port, and it is determined whether an image display device is connected to the input port in a similar manner to the detection of an image display device connected to the output port. However, in this case, it is required that the image display device connected to the input port of the present image display device establish a DDC communication channel with a device connected to its output port. Therefore, it is required that the present image display device have to issue a DDC communication request to the device connected to the input port of the present image display device. The DDC communication request can be transmitted by means of a communication using an address different from an address defined in the DDC standard. In a case in which a personal computer is connected to the input port, the communication fails, and thus it is determined that no image display device is connected to the input port. In the case it is determined herein that no image display device is connected to the input port, the process is ended without updating any information.

However, if it is determined in step S105 that an image display device is connected to the input port, the process proceeds to step S106. In step S106, information indicating the total number of connected image display devices Ct stored in the memory of the image display device connected to the input port of the present image display device is acquired. The process then proceeds to step S107. In step S107, the total number of image display devices Cti stored in the present image display device 200-1 is compared with the acquired total number of image display devices Ct. If Cti≧Ct, the process is ended. However, if Ct>Cti, the process proceeds to step S108. In step S108, Cti is set such that Cti=Ct.

In the next step S109, in response to a request issued by the controller 204-1, the DDC communication processor 207-1 establishes a communication channel between the controller 204-1 and the memory 206-1, and the controller 204-1 stores the updated value of Cti into the memory 206-1. Via the above-described steps S105 to S109, the values of the total number of connected image display devices Cti become equal for all image display devices. Thus, it becomes possible to determine the location of each image display device from the number of image display devices at downstream locations Cdi updated in step S104 and the total number of image display devices Cti.

The process described above is performed sequentially for each image display device. As a result, for example, in the image display device 200-1 in the system shown in FIG. 1, the attribute information is updated such that the number of pixels in the horizontal direction Nh=1600, the number of pixels in the vertical direction Nv=600, the number of image display devices at downstream locations Cdi=1, and the total number of image display devices Cti=2. Similarly, in the image display device 200-2 connected to the output port of the image display device 200-1, the attribute information is updated such that the number of pixels in the horizontal direction Nh=800, the number of pixels in the vertical direction Nv=600, the number of image display devices at downstream locations Cdi=0, and the total number of image display devices Cti=2.

Figure 4:
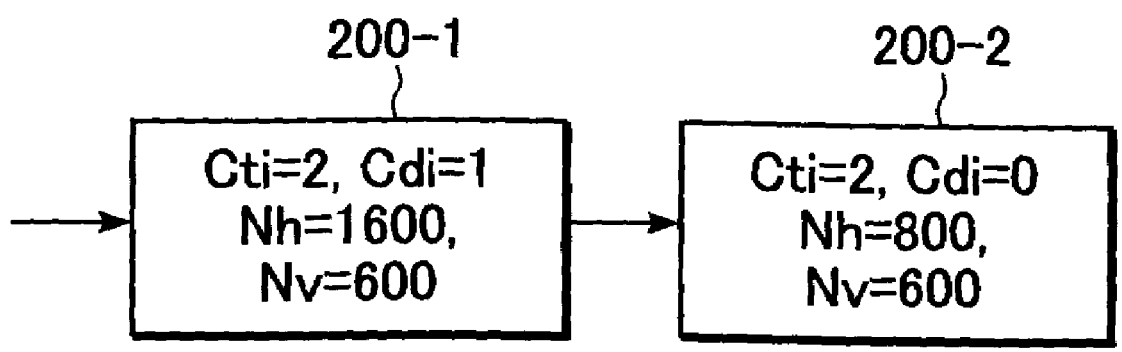
FIG. 4 is a diagram showing attribute information of the image display device according to the first embodiment of the present invention.

FIG. 4 shows the attribute information determined in the above-described manner.

If a personal computer 100 is connected to the above-described system including two image display devices, the personal computer 100 performs DDC communication with the image display device 200-1 at the first stage. From the attribute information acquired via this DDC communication, the personal computer 100 detects that the image display device connected to the personal computer 100 has a resolution of 1600 in the horizontal direction and 600 in the vertical direction. Thus, the personal computer 100 outputs a signal having an optimum resolution. More specifically, the personal computer 100 outputs an image signal having a resolution corresponding to the display resolution of the image display device connected to the personal computer 100.

A process of displaying an image according to the first embodiment is described below. Herein, it is assumed that the system is constructed as shown in FIG. 1 and the personal computer 100 outputs an image signal with a resolution of 1600 in the horizontal direction and 600 in the vertical direction.

Figure 5:
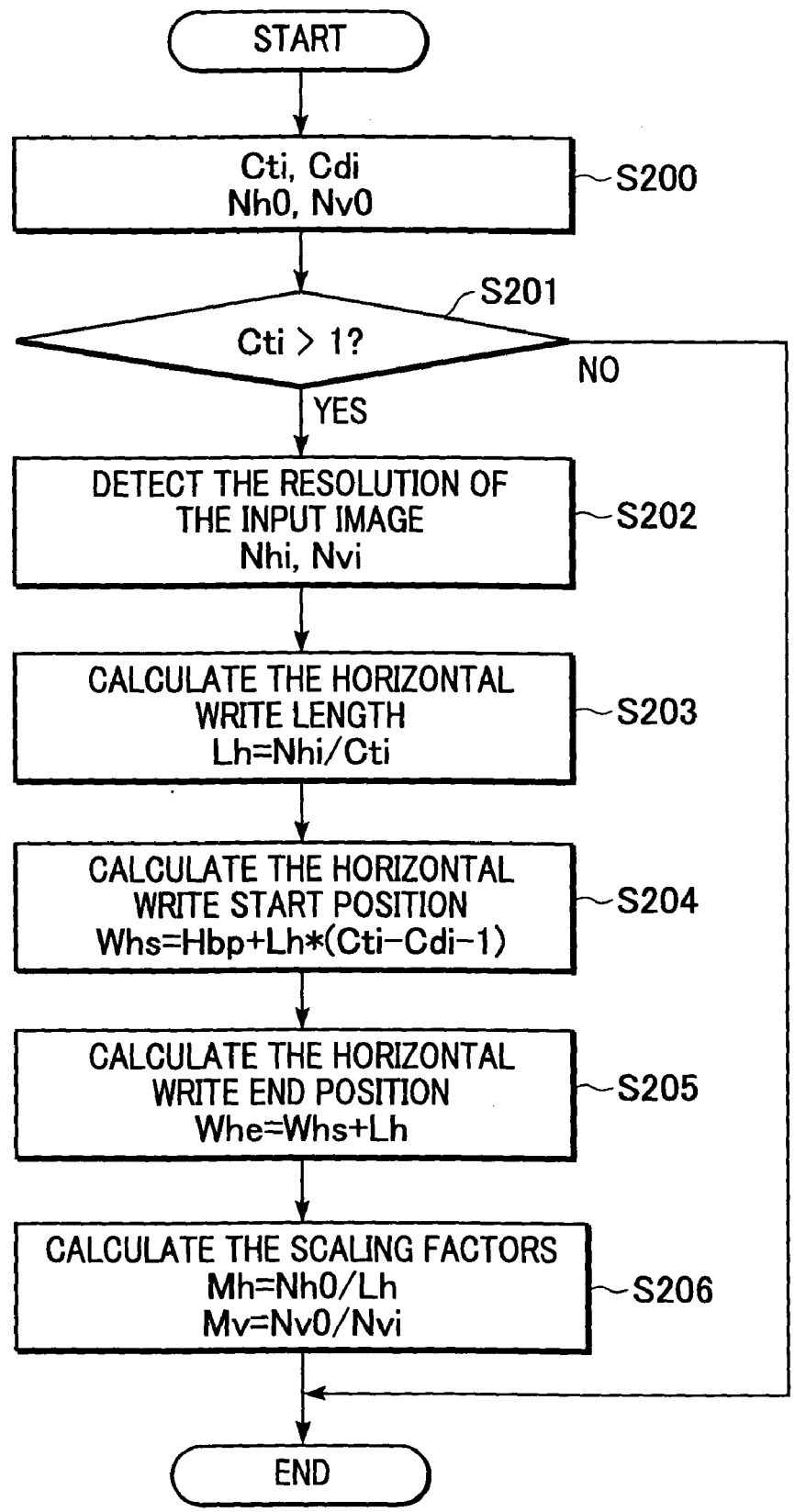
FIG. 5 is a flow chart showing a process of controlling the displaying operation of the image display device according to the first embodiment of the present invention.

FIG. 5 is a flow chart showing the process of displaying images on respective image display devices under the control of the controller 204 of each image display device.

First, in step S200, the total number of image display devices Cti, the number of image display device at downstream locations Cdi, the intrinsic number of pixels in the horizontal direction Nh0, and the intrinsic number of pixels in the vertical direction Nv0 are acquired. In the next step S201, it is determined whether Cti>1. If Cti=1, there is only one image display device, and thus the present process is terminated. In this case, an image is displayed on the single image display device in a normal manner. However, if Cti>1, it is determined that a screen is formed of a plurality of image display devices, and the process proceeds to step S202.

In step S202, the resolution (the number of pixels in the horizontal direction Nhi and the number of pixels in the vertical direction Nvi) of the input image signal is detected. The detection of the resolution can be performed by a known method used in a conventional multiscan-type image display device. In the next step S203, the horizontal write length is calculated. Herein, "write" refers to writing into the frame memory 305 shown in FIG. 2. The horizontal write length Lh can be determined by dividing the number of pixels in the horizontal direction Nhi of the image signal by the total number of image display devices Cti. This means that the image is equally assigned to all image display devices. In this specific system in which two image display devices are connected to each other, the horizontal write length Lh=800 obtained by dividing Nhi=1600 by Cti=2.

In the next step S204, the horizontal write start position Whs is calculated. If the period from a horizontal synchronization signal of the input image signal to an effective image signal is denoted by Hbp, the horizontal write start position Whs can be given by $$Whs = Hbp + Lh \times (Cti - Cdi - 1)$$

In this specific embodiment, Cti and Cdi for the image display device 200-1 at the first stage are Cti=2 and Cdi=1. Thus, the horizontal write start position Whs1 for the image display device 200-1 at the first stage is given as Whs1=Hbp. For the image display device 200-2 at the second stage, Cti=2 and Cdi=0, and thus Whs2=Hbp+800.

In the next step S205, the horizontal write end position Whe is calculated. The horizontal write end position Whe is determined by adding the horizontal write length Lh to the horizontal write start position Whs.

In the present embodiment, it is assumed that no image display devices are connected in the vertical direction, and thus the vertical write length and the vertical write start position are not calculated. In the next step S206, the display scaling factors are calculated. The display scaling factors in the horizontal and vertical directions are given by Mh=Nh0/Lh and Mv=Nv0/Nvi, respectively. That is, the display scaling factors are given by the ratios of the numbers of pixels of each image display device to the lengths of the image signal written in the frame memory.

By storing the write start positions, the write end positions, and the scale-up/down factors, calculated in the above process, into the respective registers shown in FIG. 2, it becomes possible for each image display device to display the image in a correct manner in accordance with the input image signal.

Figure 6:
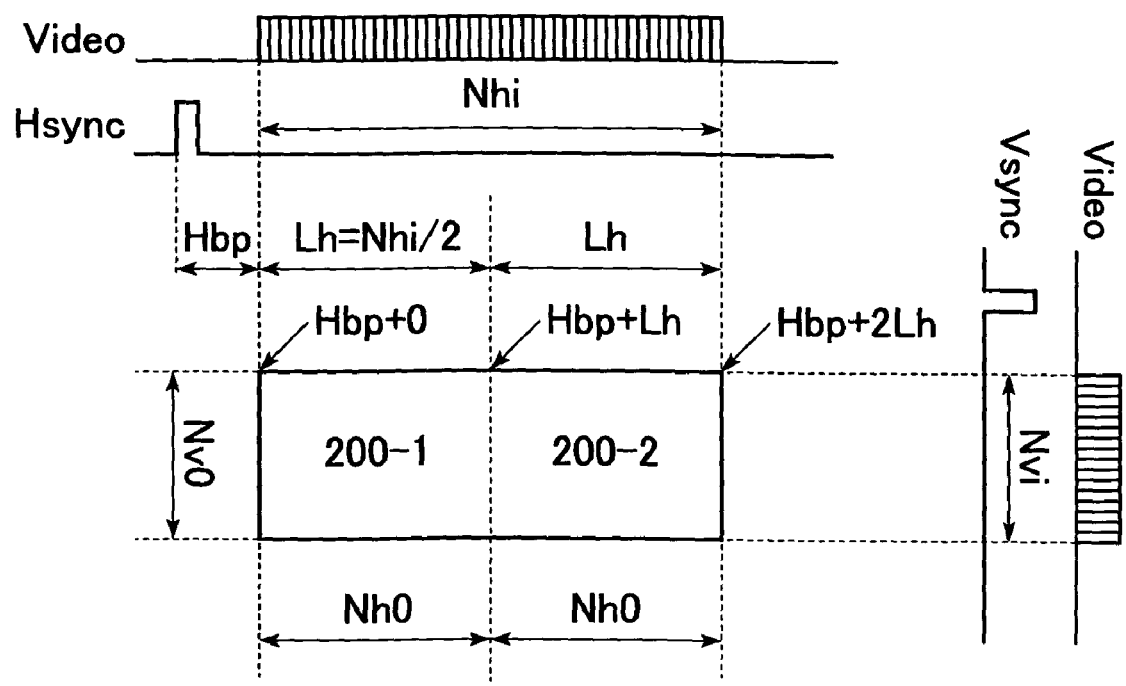
FIG. 6 is a diagram conceptually showing setting of image signal registers according to the first embodiment of the present invention.

FIG. 6 shows the manner in which the respective image display devices display the image. In FIG. 6, an area denoted by 200-1 is displayed by the image display device 200-1, and an area denoted by 200-2 is displayed by the image display device 200-2. In the image display device 200-1, Nh0=800, and thus Mh=Nh0/Lh=800/800=1. Thus, the resolution converter 202-1 directly outputs the image data (with the resolution of 800×600) stored in the frame memory 305 without scaling up/down the image data.

Although in the embodiment described above, the scaling-up/down of the input image signal is performed independently in the vertical and horizontal directions on the basis of the display area of the screen, the scaling-up/down may be performed by an equal factor in both horizontal and vertical directions so that the aspect ratio of the input image signal is maintained. In this case, the scaling-down factors may be set to be equal to a greater one of scaling-down factors in horizontal and vertical directions which will be employed if they are determined independently, or the scaling-up factors may be set to be equal to a smaller one of scaling-up factors in horizontal and vertical directions which will be employed if they are determined independently.

As described above, in the present system in which the image display devices are connected to each other such that the image display devices are capable of communicating with each other by means of DDC communication using the DDC communication controller 207, the respective image display devices acquire attribute information of the other image display devices, and the total number of pixels is calculated and stored as EDID information thereby making it possible for the personal computer to regard the connected image display devices as a single high-resolution image display device. In the connected image display devices, each image display device correctly determines which part of the image signal output from the personal computer should be displayed on the basis of the information about connections among the image display devices.

Second Embodiment

In the first embodiment described above, image display devices are connected in the horizontal direction. In this second embodiment, image display devices are connected in both horizontal and vertical directions.

Figure 7:
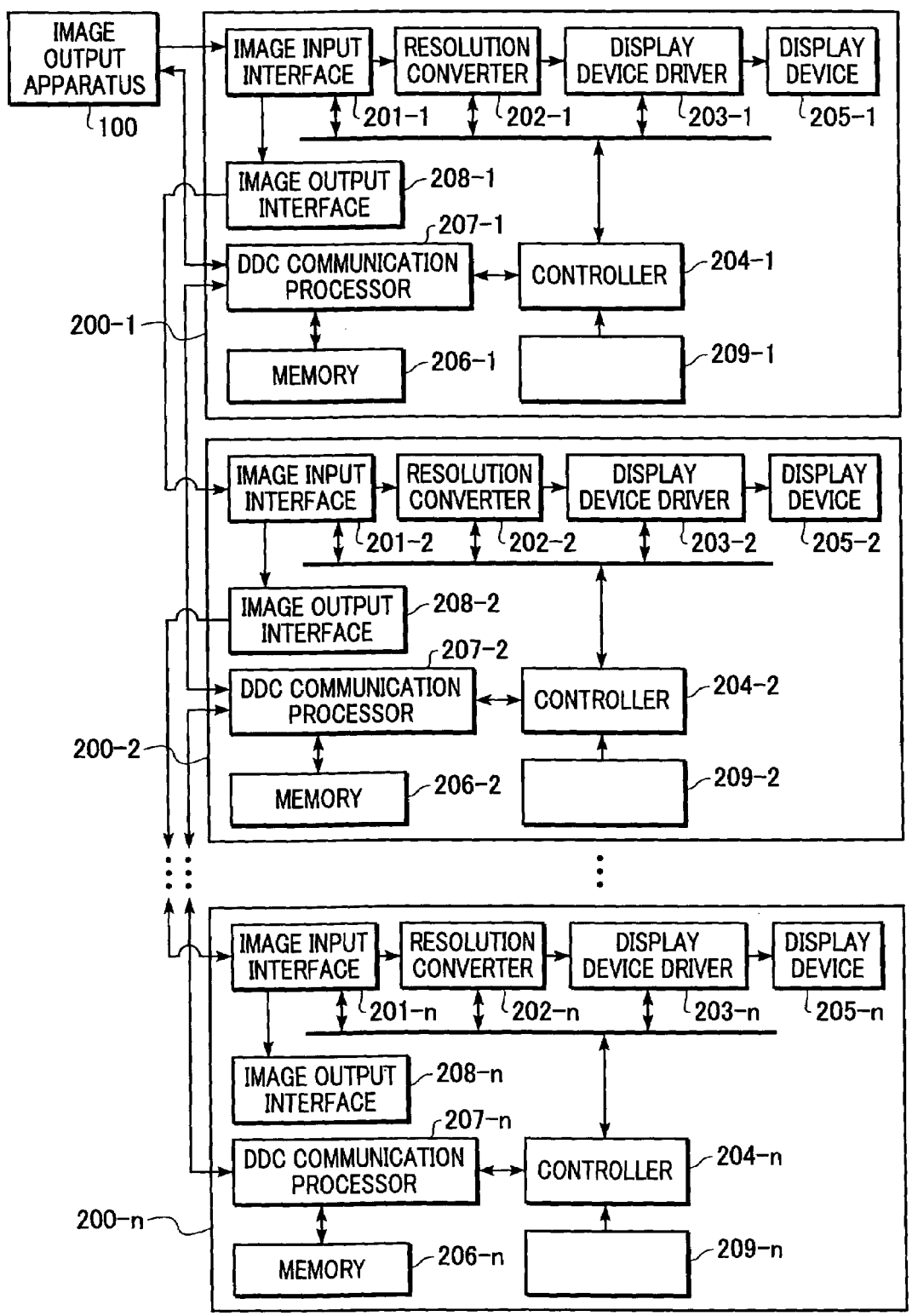
FIG. 7 is a block diagram showing an example of a construction of an image display device according to a second embodiment of the present invention.

FIG. 7 is a block diagram showing constructions of image display devices according to a second embodiment of the present invention. In FIG. 7, similar functional blocks to those in FIG. 1 are denoted by similar reference numerals. The image display devices used herein are similar to those according to the first embodiment except that each image display device additionally includes direction detection means 209. The direction detection means 209 outputs a signal indicating whether an image display device at a following stage is connected in the horizontal direction or in the vertical direction. The direction detection means 209 may be realized, for example, by a mechanical switch capable of being set into either a high or low state. For example, the mechanical switch is set into the high state to indicate that image display devices at following stages are arranged in the horizontal direction or into the low state to indicate that the image display devices at following stages are arranged in the vertical direction.

Figure 8:
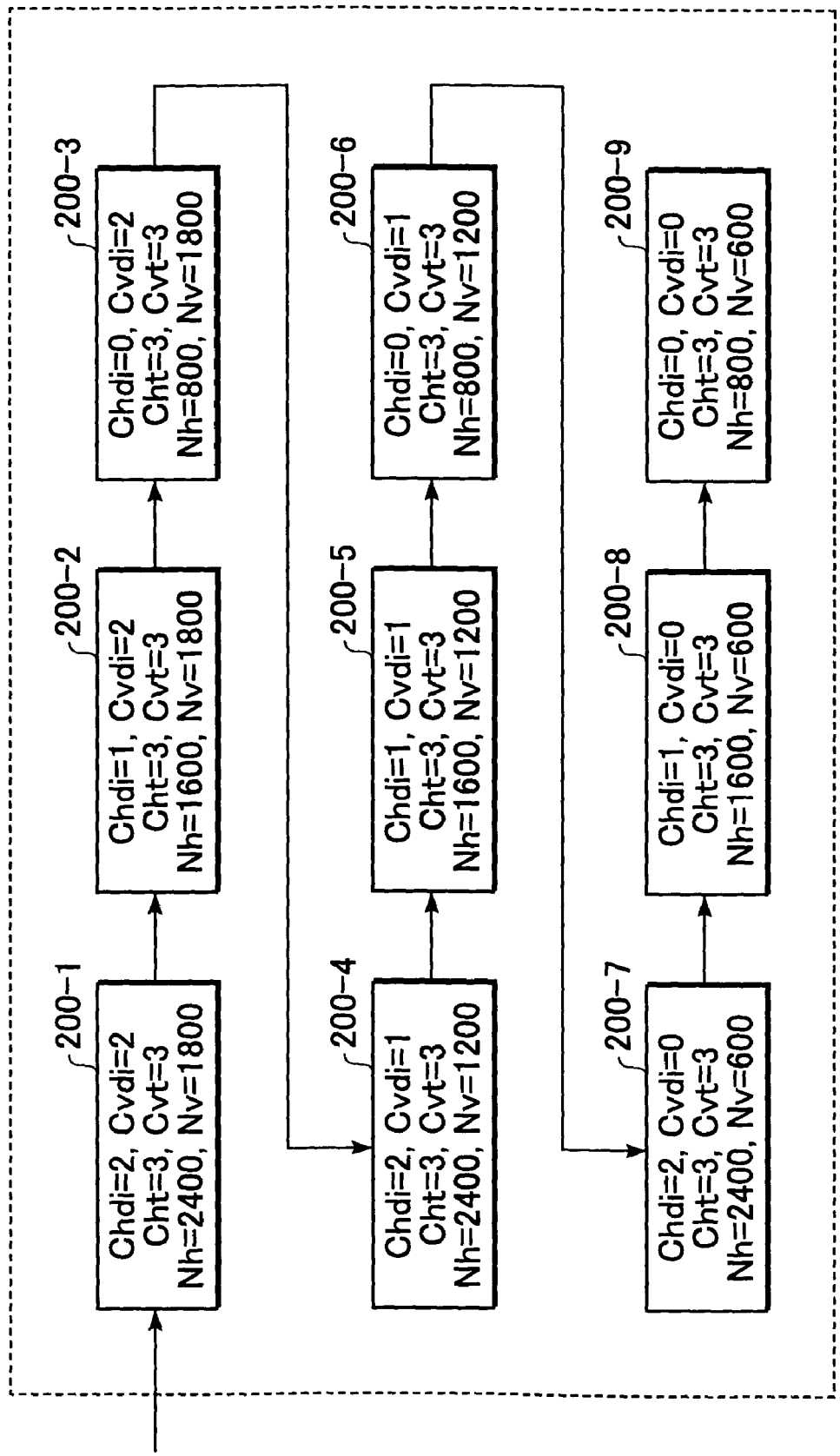
FIG. 8 is a diagram showing a manner in which image display devices are connected and showing attribute information thereof, according to the second embodiment of the present invention.
Figure 9:
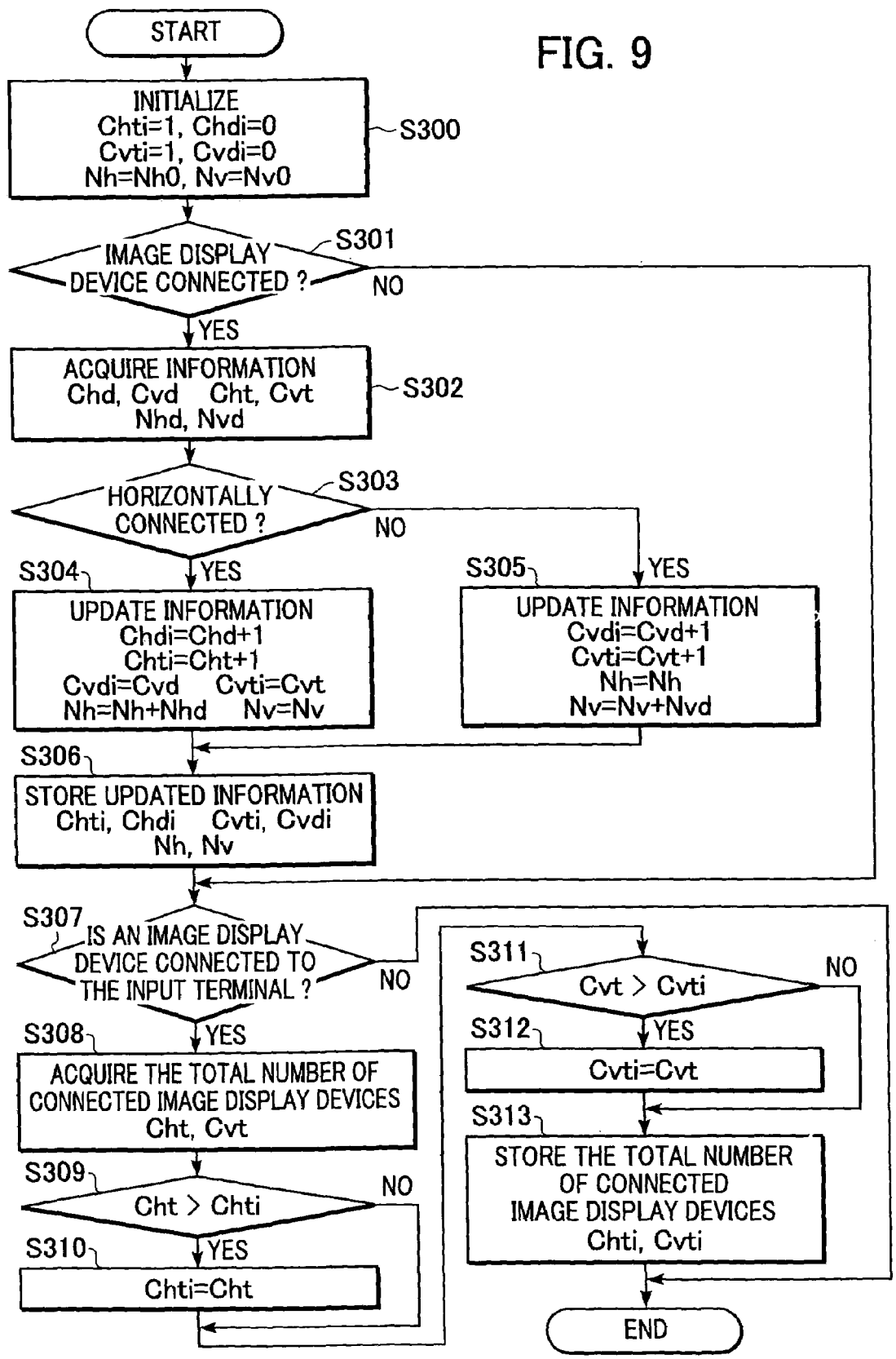
FIG. 9 is a flow chart showing setting of attribute information of the image display device according to the second embodiment.

In the present embodiment, nine image display devices are connected as shown in FIG. 8. Referring to a flow chart shown in FIG. 9, a process of displaying an image according to the second embodiment is described below.

First, in step S300, attribute information is initialized such that the total number of horizontally connected image display devices Chti=1, the number of image display devices at downstream locations in the horizontal direction Chdi=0, the total number of vertically connected image display devices Cvti=1, the number of image display devices at downstream locations in the vertical direction Cvdi=0, the number of pixels in the horizontal direction Nh=Nh0, and the number of pixels in the vertical direction Nv=Nv0. Herein, Nh0 and Nv0 denote the numbers of pixels each image display device 200-n has. In this specific embodiment, it is assumed that Nh0=800 and Nv0=600. In the next step S301, it is determined whether an image display device 200-(n+1) is connected to the output port of the image display device 200-n. Herein, if it is determined that no image display device 200-(n+1) is connected, the process skips to step S307.

If it is determined that the image display device 200-(n+1) is connected, the process proceeds to step S302 from S301. In step S302, attribute information of the image display device 200-(n+1), the number of image display devices at downstream locations in the horizontal direction Chd, the total number of horizontally connected image display devices Cht, the number of image display devices at downstream locations in the vertical direction Cvd, the total number of vertically connected image display devices Cvt, the number of pixels in the horizontal direction Nhd, and the number of pixels in the vertical direction Nvd are acquired. In this acquisition process, the DDC communication processor 207-n establishes a communication channel with the image display device 200-(n+1) connected to the output port and acquires the information stored in the memory 206-(n+1) of the image display device 200-(n+1).

The process then proceeds to step S303. In step S303, it is determined whether the connected image display device 200-(n+1) is located in horizontal direction or the in the vertical direction. This can be accomplished by examining how the direction detection means 209-n is set. If it is determined that the connected image display device 200-(n+1) is located in the horizontal direction, the process proceeds to step S304. In step S304, the attribute information of the image display device 200-n is updated. More specifically, the number of image display devices at downstream locations in the horizontal direction Chdi=Chd+1, the total number of horizontally connected image display devices Chti=Cht+1, the number of image display devices at downstream locations in the vertical direction Cvd=Cvd, the total number of vertically connected image display devices Cvti=Cvt, the number of pixels in the horizontal direction Nh=Nh+Nhd, and the number of pixels in the vertical direction Nv=Nv. Thereafter, the process proceeds to step S306.

In the case in which it is determined in step S303 that the connected image display device 200-(n+1) is located in the vertical direction, the process proceeds to step S305. In step S305, the attribute information of the image display device 200-n is updated. More specifically, the number of image display devices at downstream locations in the vertical direction Cvdi=Cvd+1, the total number of vertically connected image display devices Cvti=Cvt+1, the number of pixels in the horizontal direction Nh=Nh, and the number of pixels in the vertical direction Nv=Nv+Nvd. Thereafter, the process proceeds to step S306.

In step S306, in response to a request issued by the controller 204-n, the DDC communication processor 207-n establishes a communication channel between the controller 204-n and the memory 206-n, and Chti, Chdi, Cvti, Cvdi, Nh, and Nv updated in step S304 or S305 are stored into the memory 206-n.

In the next step S307, it is determined whether an image display device is connected to the input port. In this process, in response to a request issued by the controller 204-n, the DDC communication processor 207-n establishes a communication channel between the controller 204-n and a device connected to the input port. In the case it is determined herein that no image display device is connected to the input port, the process is ended without updating any information. However, if it is determined that an image display device is connected to the input port, the process proceeds to step S308. In step S308, the total number of horizontally connected image display devices Cht and the total number of vertically connected image display devices Cvt are acquired from the memory 206-(n−1) of the image display device 200-(n−1) connected to the input port. The process then proceeds to step S309. In step S309, the total number of horizontally connected image display devices Chti stored in the present image display device 200-n is compared with the acquired total number of horizontally connected image display devices Cht. If Chti=Cht, the process proceeds to step S311. However, if Cht>Chti, the process proceeds to step S310. In step S310, the value of Chti is replaced by the value of Cht.

The process then proceeds to step S311. In step S311, the total number of vertically connected image display devices Cvti stored in the present image display device 200-n is compared with the acquired total number of vertically connected image display devices Cvt. If Cvti=Cvt, the process proceeds to step S313. However, if Cvt>Cvti, the process proceeds to step S312. In step S312, the value of Cvti is replaced with the value of Cvt.

The process then proceeds to step S313. In step S313, in response to a request issued by the controller 204-n, the DDC communication processor 207-n establishes a communication channel between the controller 204-n and the memory 206-n, and the controller 204-n stores the updated values of Chti and Cvti into the memory 206-n.

Via the above-described steps S307 to S313, the values of the total number of horizontally connected image display devices Chti and the total number of vertically connected image display devices Cvti become equal for all image display devices. Thus, it is possible to determine the location of each image display device from the number of image display devices at downstream locations in the horizontal direction Chdi, the number of image display devices at downstream locations in the vertical direction Cvdi, the total number of horizontally connected image display devices Chti, and the total number of vertically connected image display devices Cvti, which have been updated in step S330.

The process described above is performed sequentially for each image display device. In the present system in which image display devices each having Nh0=800 and Nv0=600 are disposed as shown in FIG. 8, the attribute information of, for example, the image display device 200-1 at the first stage is updated in the above process such that the number of pixels in the horizontal direction Nh=2400, the number of pixels in the vertical direction Nv=1800, the total number of horizontally connected image display devices Chti=3, and the total number of vertically connected image display devices Cvti=3. The attribute information is shown in FIG. 8 for all image display devices.

If a personal computer is connected to the above-described system in which image display devices are connected in the manner shown in FIG. 8, the personal computer performs DDC communication with the image display device 200-1 at the first stage. From the attribute information acquired via this DDC communication, the personal computer detects that the image display device connected to the personal computer has a resolution of 2400 in the horizontal direction and 1800 in the vertical direction. Thus, the personal computer outputs a signal having an optimal resolution corresponding to the detected resolution of the image display device. A process of displaying an image is described below. Herein, it is assumed by way of example that the personal computer outputs an image signal with a QXGA resolution, that is, a 2048×1536 resolution.

Figure 10:
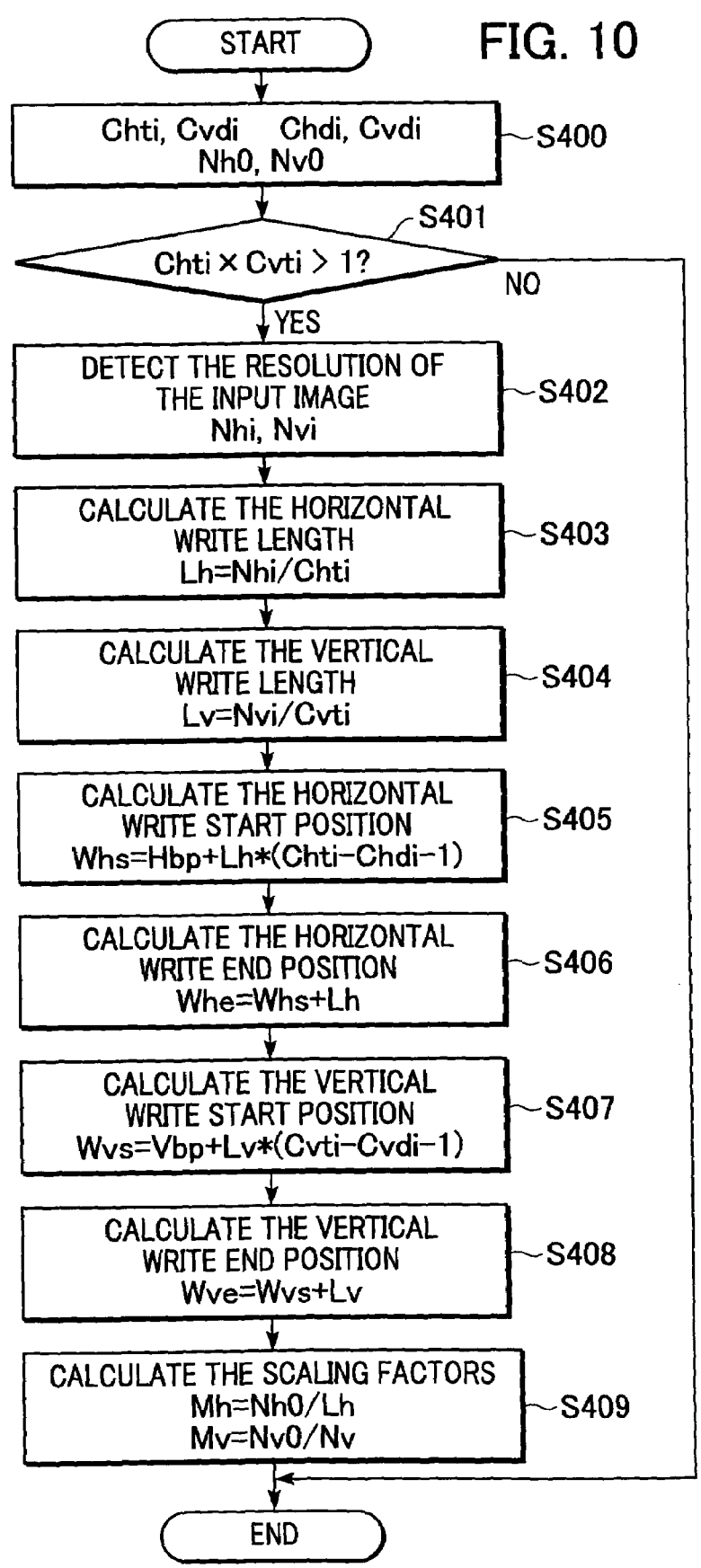
FIG. 10 is a flow chart showing a process of controlling the displaying operation of the image display device according to the second embodiment of the present invention.

FIG. 10 is a flow chart showing a process of displaying an image according to the second embodiment of the present invention. First, in step S400, the total number of horizontally connected image display devices Chti, the number of image display devices at downstream locations in the horizontal direction Chdi, the total number of vertically connected image display devices Cvti, the number of image display devices at downstream locations in the vertical direction Cvdi, the intrinsic number of pixels in the horizontal direction Nh0, and the intrinsic number of pixels in the vertical direction Nv0 are acquired. In the next step S401, it is determined whether Chti×Cvti>1. If Chti×Cvti=1, there is only one image display device, and thus the present process is terminated. In this case, an image is displayed on the single image display device in a normal manner. However, if Chti×Cvti>1, it is determined that a screen is formed of a plurality of image display devices, and the process proceeds to step S402.

In step S402, the resolution (the number of pixels in the horizontal direction Nhi and the number of pixels in the vertical direction Nvi) of the input image signal is detected. The detection of the resolution can be performed by a known method used in a conventional multiscan-type image display device. In the next step S403, the horizontal write length is calculated. Herein, "write" refers to writing into the frame memory 305 shown in FIG. 2. The horizontal write length Lh can be determined by dividing the number of pixels in the horizontal direction Nhi of the image signal by the total number of horizontally connected image display devices Chti. In the next step S404, the vertical write length is calculated. The vertical write length Lv can be determined by dividing the number of pixels in the vertical direction Nvi of the image signal by the total number of vertically connected image display devices Cvti. This means that the image is equally assigned to all image display devices. In the present system in which nine image display devices are connected in such a manner as shown in FIG. 8, Lh and Lv are determines as Lh=683 and Lv=512 from Nhi=2048, Nvi=1536, Chti=3, and Cvti=3.

Thereafter, in step S405, the horizontal write start position Whs is calculated. If the period from a horizontal synchronization signal of the input image signal to an effective image signal is denoted by Hbp, the horizontal write start position Whs can be given by $$Whs = Hbp + Lh \times (Chti - Chdi - 1)$$

For image display devices 200-1, 200-4, and 200-7 at the first stage in the respective horizontal lines, Whs is given as Whs1=Hbp from Chti=3 and Chdi=2. For image display devices 200-2, 200-5, and 200-8 at the second stage in the respective horizontal lines, Whs is given as Whs2=Hbp+683 from Chti=3 and Chdi=1. For image display devices 200-3, 200-6, and 200-9 at the third stage in the respective horizontal lines, Whs is given as Whs3=Hbp+1366 from Chti=3 and Chdi=0.

In the next step S406, the horizontal write end position Whe is calculated. The horizontal write end position Whe is determined by adding the horizontal write length Lh to the horizontal write start position Whs. That is, Whe=Whs+Lh.

In the next step S407, the vertical write start position Wvs is calculated. If the period from a vertical synchronization signal of the input image signal to an effective image signal is denoted by Vbp, the vertical write start position Wvs can be given by $$Wvs = Vbp + Lv \times (Cvti - Cvdi - 1)$$

For image display devices 200-1, 200-2, and 200-3 at the first stage in the respective vertical lines, Wvs is given as Wvs1=Vbp from Cvti=3 and Cvdi=2. For image display devices 200-4, 200-5, and 200-6 at the second stage in the respective vertical lines, Wvs is given as Wvs1=Vbp+512 from Cvti=3 and Cvdi=1. For image display devices 200-7,

200-8, and 200-9 at the third stage in the respective vertical lines, Wvs is given as Wvs2=Vbp+1024 from Cvti=3 and Cvdi=0.

In the next step S408, the vertical write end position Wve is calculated. The vertical write end position Wve is determined by adding the vertical write length Lv to the vertical write start position Wvs.

Figure 11:
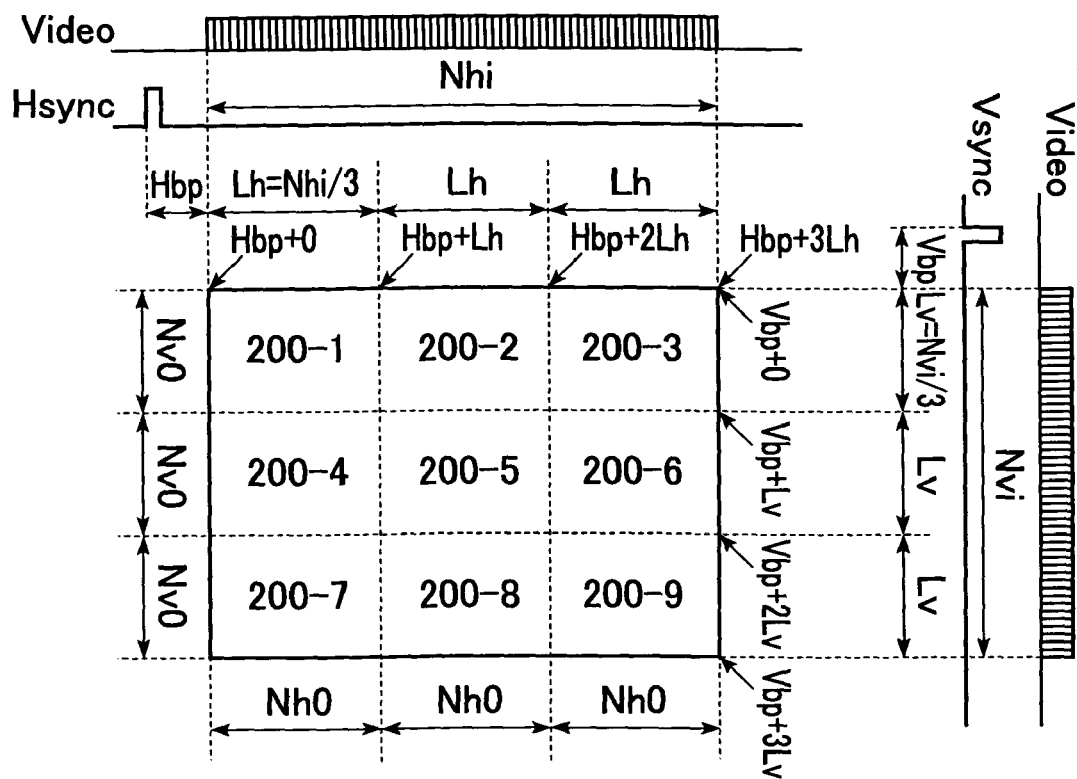
FIG. 11 is a diagram conceptually showing setting of image signal registers according to the second embodiment of the present invention.
Figure 12:
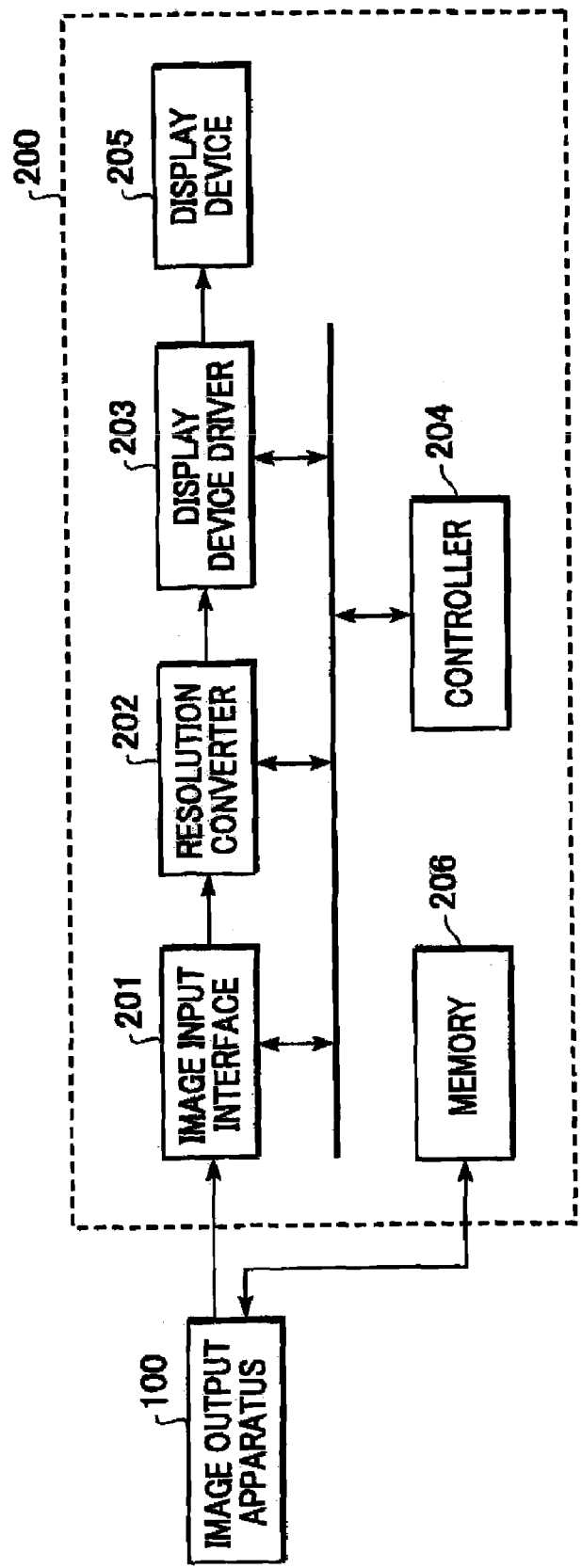
FIG. 12 is a block diagram showing an example of a construction of an image display device of a generally used type.
Figure 13:
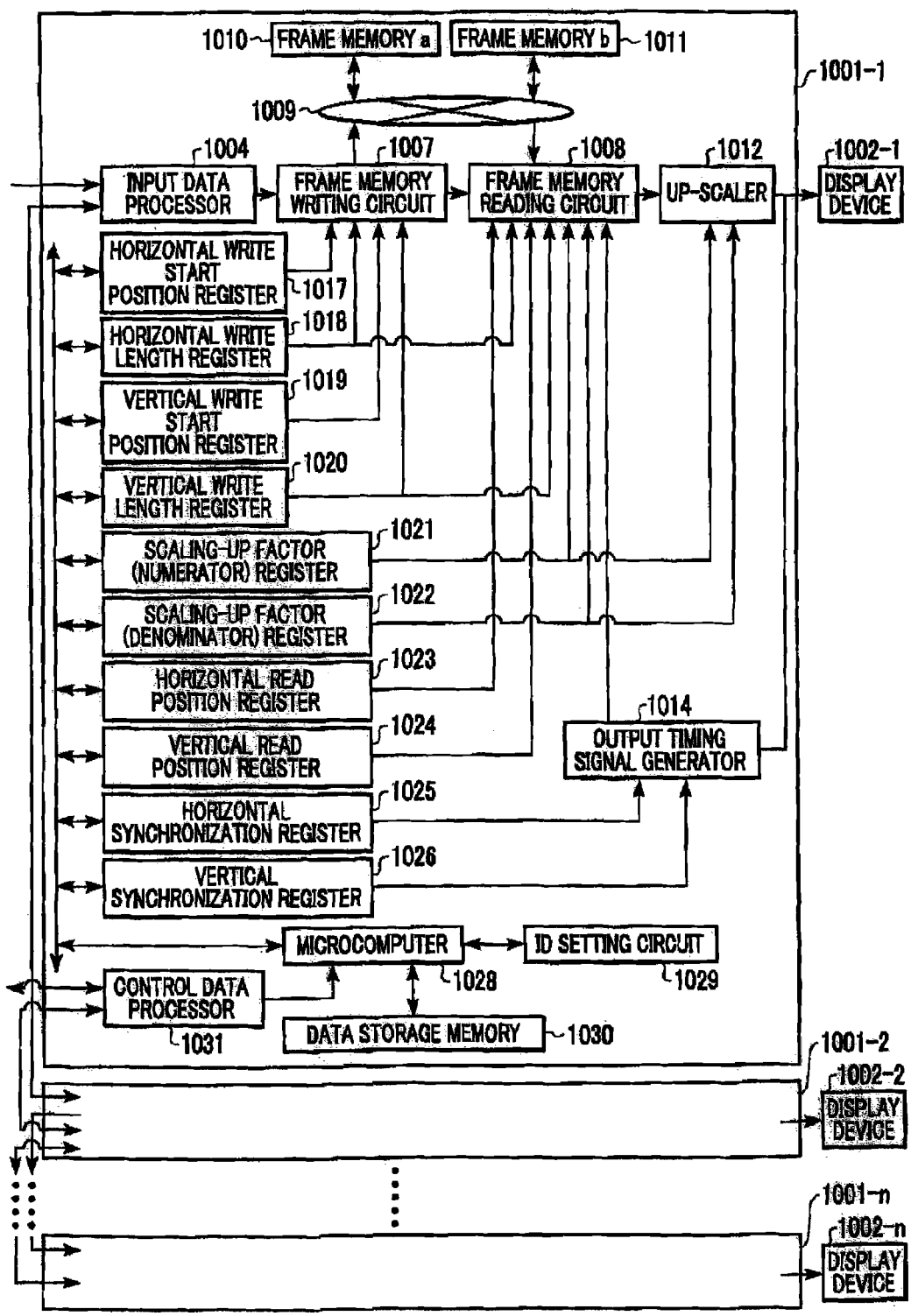
FIG. 13 is a block diagram showing an example of a construction of an image display device which can be used as a component of a multidisplay system.

Thereafter, the process proceeds to step S409. In step S409, the display scaling factors are calculated. The display scaling factors in the horizontal and vertical directions are given by Mh=Nh0/Lh and Mv=Nv0/Lv, respectively. That is, the display scaling factors are given by the ratios of the numbers of pixels of each image display device to the lengths of the image signal written in the frame memory. In the present example, Mh=800/683=1.17, and Mv=600/512=1.17. FIG. 11 shows the attribute information determined in the above-described manner.

Although in the embodiment described above, the scaling-up/down of the input image signal is performed independently in the vertical and horizontal directions on the basis of the display area of the screen, the scaling-up/down may be performed by an equal factor in both horizontal and vertical directions so that the aspect ratio of the input image signal is maintained. In this case, the scaling-down factors may be set to the greater of the scaling-down factors in the horizontal and vertical directions which will be employed if they are determined independently, or the scaling-up factors may be set to the smaller of the scaling-up factors in horizontal and vertical directions which will be employed if they are determined independently.

As described above, in the present system in which the image display devices are connected to each other such that the image display devices are capable of communicating with each other by means of DDC communication using the DDC communication controller 207, the respective image display devices acquire attribute information of the other image display devices, and the total number of pixels is calculated and stored as EDID information thereby making it possible for the personal computer to regard the connected image display devices as a single high-resolution image display device. In the connected image display devices, each image display device correctly determines which part of the image signal output from the personal computer should be displayed on the basis of the information about connections among the image display devices.

Although in the embodiments described above, each image display device acquires Chti, Chdi, Cvti, and Cvdi by communicating with adjacent image display devices located at preceding and following stages, Chti, Chdi, Cvti, and Cvdi may be set by a user by setting a switch or the like provided in each image display device. In this case, the resolution can be determined by performing a simple calculation of the cumulative sum via the DDC communication.

As described above, the present invention makes it possible to realize a multidisplay system at low cost using image display devices which may also be used as standalone image display devices.

Furthermore, the present invention makes it possible to realize a multidisplay system having a plurality of image display devices without an additional controller for controlling the display operation.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image display apparatus, comprising:
   input/output means for transferring image data input from a first image display device having a display unit, wherein the first image display device is disposed at an upstream location to a second image display device;
   acquisition means for acquiring resolution information of the second image display device having a second display unit;
   generation means for generating resolution information on the basis of the resolution information acquired by the acquisition means and a resolution of the display unit;
   first storage means for storing the generated resolution information;
   direction detection means for determining a direction, wherein the direction is determined by assigning a value based upon detecting whether at least one image display device connected at a downstream location from the first image display device is arranged in a vertical or horizontal direction and, wherein the generation means generates the resolution information by cumulatively adding the resolution of the display unit with the resolution information acquired by the acquisition means in the direction determined by the direction detection means;
   detection means for detecting a location of a present image display device in a multidisplay device system;
   determination means for determining which part of the image data should be displayed by a present display unit of the present image display device on the basis of the location detected by the detection means; and
   display control means for displaying the part of the image data.

2. An image display apparatus according to claim 1, further comprising:
   communication processing means for performing DDC (Display Data Channel) communication with an external device; and
   a memory for storing EDID (Extended Display Identification Data) information transformed in the DDC communication, wherein the acquisition means acquires resolution information using the communication processing means and where
   the first storage means stores the resolution information generated by the generation means by rewriting a corresponding item of the EDID information in the memory.

3. An image display apparatus according to claim 1 wherein the display control means determines the display scaling factor on the basis of the number of pixels of the part of the image data to be displayed and on the basis of the resolution of the present display unit, converts the resolution of the part of the image data in accordance with the determined display scaling factor, and displays the part of the image data on the present display unit.

4. An image display apparatus according to claim 1 wherein the detection means comprises:
   second storage means for acquiring chain connection information indicating the manner in which further image display devices are chain-connected at downstream locations of the present image display device, generating chain connection information associated with the present image display device on the basis of the acquired chain connection information, storing the generated chain connection information such that an upstream image display device at an upstream location from the present image display device can acquire the chain connection information; and third storage means for acquiring a first value, wherein the first value is the total number of image display devices connected at downstream locations from the present image display device and storing the first value such that the upstream image display device can acquire the first value, wherein the detection means determines the location of the present image display device in the multidisplay device system on the basis of the chain connection information and the first value.

5. An image display apparatus according to claim 4, further comprising:

direction detection means for detecting whether the image display devices connected at downstream locations from the present image display device are arranged in the vertical or horizontal direction, wherein the chain connection information includes a second value, wherein the second value is information indicating the total number of image display devices chain-connected in the vertical direction and a third value, wherein the third value is information indicating the total number of image display devices chain-connected in the horizontal direction.

6. A multidisplay system including a plurality of image display apparatus according to claim 1, wherein the plurality of image display apparatus are connected to each other and where a host computer is connected to an image display apparatus at a most upstream location of the connected plurality of image display apparatus.

7. An image display method using an image display apparatus, the image display method comprising the steps of:

inputting image data from a first image display device and outputting the image data to a second image display device disposed at a downstream location from the first image display device;

acquiring resolution information from the second image display device having a second display unit;

generating resolution information on the basis of the resolution information from the second image display device and resolution of a display unit of the first image device;

storing the generated resolution information;

direction detection, wherein the step of direction detection determines a direction that is assigned a value based on whether image display devices connected at downstream locations from the first image device are arranged in the vertical or horizontal direction, wherein in the generating step, the generated resolution information is obtained by cumulatively adding the resolution of the display unit with the resolution information acquired in the acquiring step in the direction determined in the direction detection step;

detecting the location of a present image display device, having a present display unit, in a multidisplay system, wherein the multidisplay system includes a plurality of image display devices;

determining which Part of the image data should be displayed by the present display unit on the basis of the location detected in the detecting the location step; and displaying the part of the image data on the present display unit.

8. An image display method according to claim 7, further comprising the step of:

performing DDC communication with an external device, and storing EDID information obtained via the DDC communication.

9. An image display method according to claim 8 where in the acquisition step, the resolution information is acquired using a communication processor and where in the storage step, the storing of the resolution information generated in the generation step, is accomplished by rewriting a corresponding item of the EDID information in the memory.

10. An image display method according to claim 7, wherein the displaying step includes the steps of:

determining the display scaling factor on the basis of the number of pixels of the part of the image data to be displayed and on the basis of the resolution of the present display unit, converting the resolution of the part of the image data in accordance with the determined display scaling factor, and displaying the part of the image data on the present display unit.

11. An image display method according to claim 7, wherein the detecting the location step includes the steps of:

acquiring chain connection information indicating the manner in which further image display devices are chain-connected at downstream locations from the present image display device;

generating chain connection information associated with the present image display device on the basis of the acquired chain connection information, and storing the generated chain connection information such that an image display device at an upstream location from the present image display device can acquire the chain connection information;

acquiring a first value, wherein the first value is the total number of image display devices connected at downstream locations from the present image display device and storing the total number of image display devices such that the image display device at the upstream location from the present image display device can acquire the first value; and detecting the location of the present image display device in the multidisplay system on the basis of the chain connection information and the first value.

12. An image display method according to claim 11, further comprising the step of:

determining whether image display devices connected at downstream locations from the present image device are arranged in the vertical or horizontal direction, wherein the chain connection information includes information indicating a second value, wherein the second value is the total number of image display devices chain-connected in the vertical direction, and a third value, wherein the third value is information indicating the total number of image display devices chain-connected in the horizontal direction.

13. A display control apparatus for controlling an image display apparatus, comprising:

input/output means for transferring image data input from a first image display device disposed at an upstream location to a second image display device;

acquisition means for acquiring resolution information of the second image display device having a second display unit;

generation means for generating resolution information on the basis of the resolution information acquired by the acquisition means and the resolution of a display unit of the first image display device;

first storage means for storing the generated resolution information;

direction detection means for determining a direction, wherein the direction is determined by assigning a value based upon detecting whether at least one image display device connected at a downstream location from the first image display device is arranged in a vertical or horizontal direction and, wherein the generation means generates the resolution information by cumulatively adding the resolution of the display unit with the resolution information acquired by the acquisition means in the direction determined by the direction detection means;

detection means for detecting a location of a present image display device in a multidisplay device system;

determination means for determining which part of the image data should be displayed by a present display unit of the present image display device on the basis of the location detected by the detection means; and display control means for displaying the part of the image data.

14. A display control apparatus according to claim 13, further comprising:

communication processing means for performing DDC communication with an external device; and a memory for storing EDID information transformed in the DDC communication, wherein the acquisition means acquires resolution information using the communication processing means and where the first storage means stores the resolution information generated by the generation means by rewriting a corresponding item of the EDID information in the memory.

\* \* \* \* \*